Figure 1:
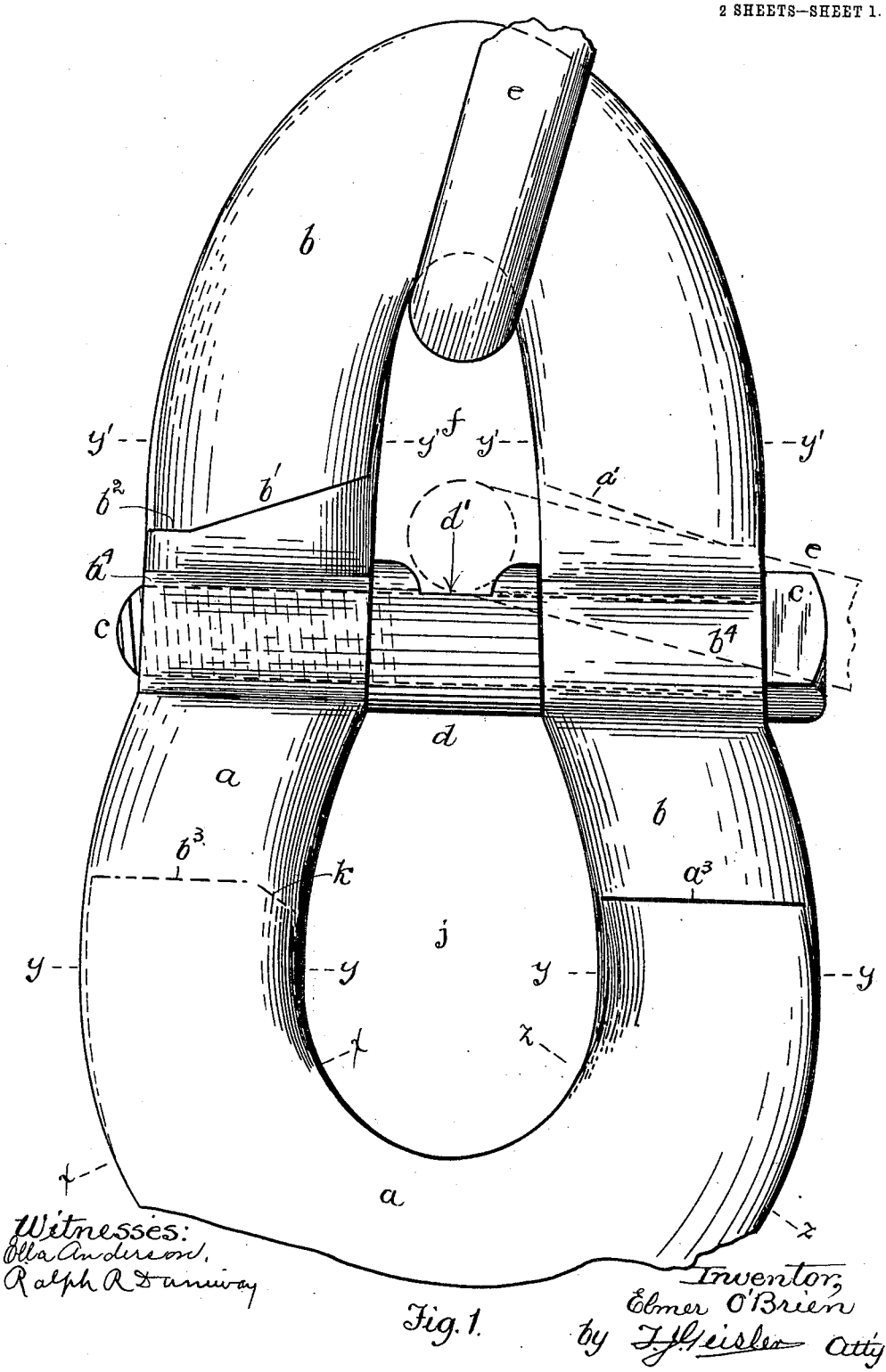

No. 825,862. PATENTED JULY 10, 1906.
E. O'BRIEN.
BUTT HOOK.
APPLICATION FILED APR. 7, 1905.

2 SHEETS—SHEET 1.

Witnesses:
Olla Anderson.
Ralph R. Duniway

Inventor,
Elmer O'Brien
by T. J. Geisler Atty.

THE NORRIS PETERS CO., WASHINGTON, D. C.

No. 825,862. PATENTED JULY 10, 1906.
E. O'BRIEN.
BUTT HOOK.
APPLICATION FILED APR. 7, 1905.
2 SHEETS—SHEET 2.
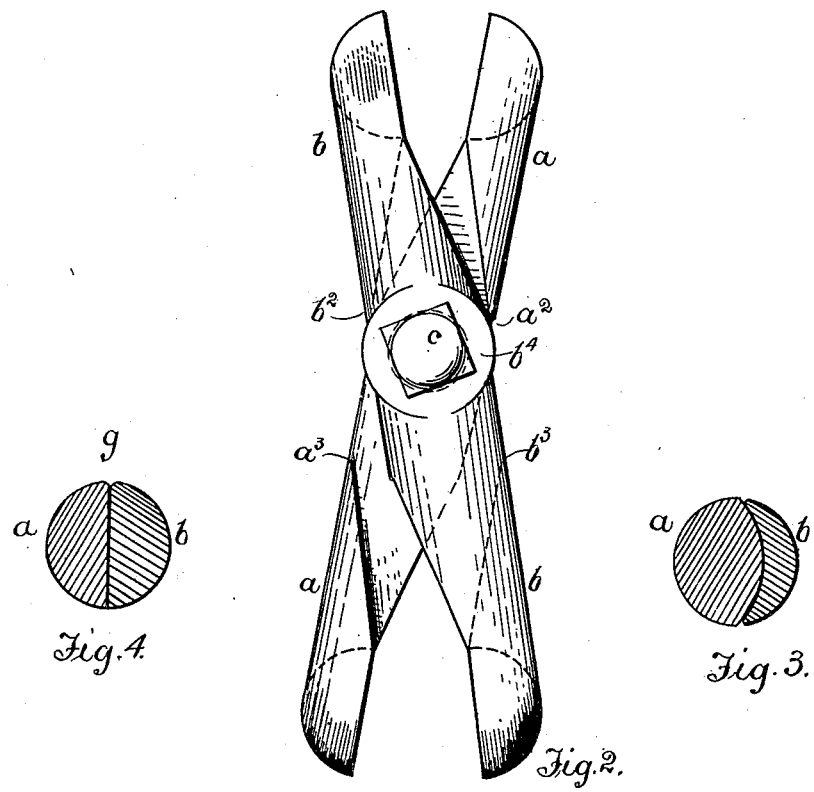
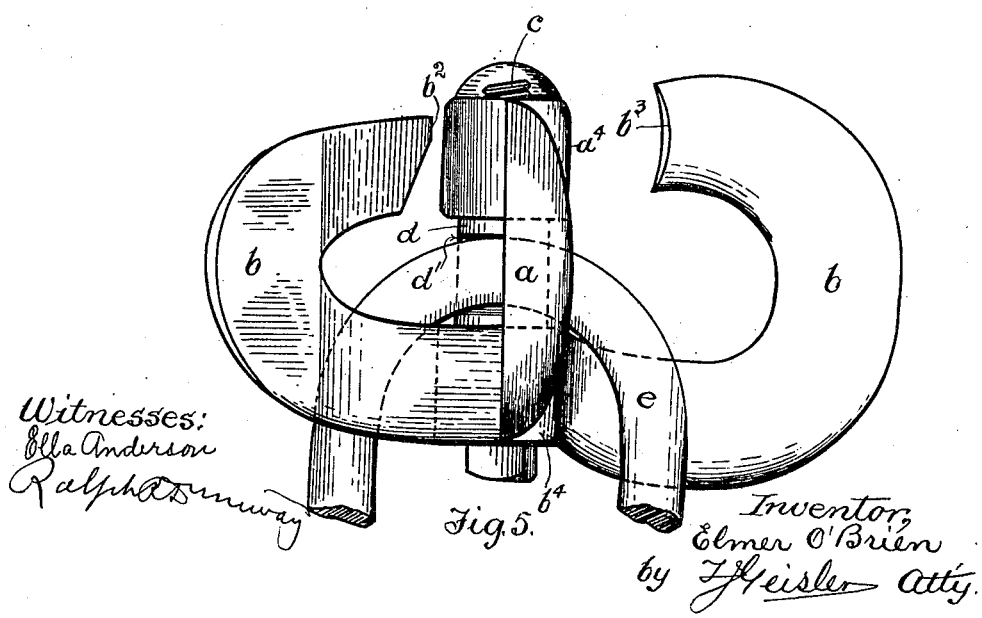
Witnesses:
Ella Anderson
Ralph A Dunway
Inventor,
Elmer O'Brien
by F Heisler Atty.

UNITED STATES PATENT OFFICE.

ELMER O'BRIEN, OF ALMA, OREGON.

BUTT-HOOK.

No. 825,862.  Specification of Letters Patent.  Patented July 10, 1906.

Application filed April 7, 1905. Serial No. 254,401.

*To all whom it may concern:*

Be it known that I, ELMER O'BRIEN, a citizen of the United States, and a resident of Alma, Lane county, State of Oregon, have invented a new and useful Improvement in Butt-Hooks, of which the following is a specification, reference being had to the accompanying drawings as constituting a part thereof.

My invention relates to butt-hooks, designed more especially for use in log-hauling; and it has for its object to provide a strong hook made of two pivotally-connected parts adapted to be opened at one end for the purpose of securing thereon the ring of a hauling chain or cable and embodying the particular features hereinafter described and claimed.

The construction and arrangement of my hook is as illustrated in the drawings, in which—

Figure 1 is a front elevation of my hook. Fig. 2 illustrates a side elevation of my hook, showing the two pivoted members thereof partly spread apart. Fig. 3 is a cross-section taken on either lines $y\ y$ or $y'\ y'$ of Fig. 1, but on a scale corresponding with the preceding figure; and Fig. 4 represents a cross-section taken on either lines $x\ x$ or $z\ z$ of Fig. 1, also on a scale corresponding with Fig. 2; and Fig. 5 is a top view of my butt-hook, showing the pivoted members thereof spread apart so as to receive the eye of a hauling-cable on the lower part of the hook.

Referring to the letters as designating the parts described, in the construction of my butt-hook the same comprises five essential parts—namely, two members or parts $a\ b$, a screw-bolt $c$, a sleeve $d$, and a ring $e$. The member $a$ is made with a threaded hole and the member $b$ with a smooth-bore hole, so that the extremity of the shank of the screw-bolt $c$ may be inserted through the hole of the member $b$ and secured in the member $a$, having previously placed on the screw-bolt intermediate of the two members the sleeve $d$, which serves to keep the two members apart and to hold them in position.

To the ring $e$ is fastened the cable of the logging or hauling engine. The ring $e$ is not removable from the two members $a\ b$ of my hook without first withdrawing the screw-bolt $c$, and this construction is one of the features of my invention, since it prevents the disengagement of the ring $e$ from my hook by any accidental means. The ring $e$ operates to lock the two members $a\ b$ of the hook together so long as any hauling strain is exerted on the hook. The parts of my hook are furthermore so arranged that even when there is no hauling strain on the ring $e$ the latter will nevertheless hold the members $a\ b$ together.

In order to accomplish the described results, it is essential that the parts be relatively proportioned with respect to each other, which relative proportioning is readily ascertainable by having reference to my hook and its parts as the same is represented in Fig. 1, in which my hook is shown in life size—that is to say, the diameter and the cross-section of the ring $e$ must be of such relative size with regard to the opening $f$ and the cross-section area of the upper parts of the two members of my hook taken together that the ring $e$ will securely lock said members until such ring is dropped to the bottom of the opening $f$ and arranged as shown in dotted outline in Fig. 1. It is also to be noted from Fig. 1 that the ring $e$ would have to lie in the recesses $d'$ of the sleeve $d$ to be arranged as shown in dotted outline in Fig. 1 and that until so arranged the upper parts of the members $a\ b$ could not be cleared sufficiently to allow said members to be opened to the extent required to disengage the hauling-cable. It is also to be noted that even when the ring $e$ has been arranged as just described the hauling-cable could not become unhitched unless simultaneously therewith the eye of the hauling-cable fastened on the lower part of the hook be moved close to the sleeve $d$, so as to clear the end $a^3$ of the member $a$ or the end $b^3$ of the member $b$.

To allow the members $a\ b$ to be separated sufficiently for the attachment or removal of the ring of the hauling-cable, the ends $a'\ b'$ of said members are made beveled, as shown in Fig. 1.

The members $a\ b$ cannot be opened sufficiently to allow the attachment or the removal of the eye of the hauling-cable from the lower part of my hook until the beveled faces $a'\ b'$ come in contact with the ring $e$ while the latter is arranged as shown in dotted outline in Fig. 1, such contact occurring approximately at the middle of said beveled faces or ends $a'\ b'$.

The points $a^2\ b^2$ of the beveled ends $a'\ b'$ are made approximately a distance of a quarter of an inch from the bosses $a^4\ b^4$.

The abutting faces of the extremities of the members $a\ b$ on the section-lines $y\ y$ or $y'$ $y'$ are convexed and concaved, respectively, so as to interlock with each other, as illustrated in Fig. 4, for the purpose of rendering such extremities of the individual members as strong as possible. By this construction I substantially increase the cross-section area and strength of the member $a$ at an unimportant expense of the cross-section area of the member $b$. The advantage of this construction is manifest. Should there be any undue lateral pull upon the extremities of the members of my hook, the said interlocking feature of the same will prevent any displacement of the weaker member $b$ by such pull, since the two extremities will effectually contribute to each other's power of resistance. If, on the other hand, the cross-section of the extremities $a$ $b$ were made with flat abutting faces, a lateral pull would obviously have a tendency of displacing the weaker extremity of the member $b$, and if the extremities of the members $a$ $b$ were both made of equal cross-section area neither would be very strong and neither could as effectually contribute its strength to the other as if made as described.

The recesses $d'$ in the sleeve $d$ also allow said sleeve to be turned around so as to increase the space $j$ sufficiently to permit a greater number or larger-sized eyes or rings to be attached on the lower part of my hook.

The point $k$ of the member $b$ of my hook may be slightly beveled, as illustrated in Fig. 1, so as to facilitate the affixing of the eye of the hauling-cable on my hook at this point. After such eye has been so placed the same is moved to the section of the member $b$ above the end $a^3$ of the member $a$. The two members are then arranged together and the hook is hitched ready for service. When once the hauling-cable is hitched to my hook, there is no danger of its becoming accidentally unhooked again. There is consequently no necessity for having a person attending the hook to see that it does not unhitch, which is required in hooks of ordinary construction and imposes a most dangerous duty, and the safety feature of my hooks also inures to the benefit of the logger, since frequent unhitchings impose a considerable loss of time.

In practice it is convenient to make the main body of the member $a$ a trifle larger in cross-section than the member $b$, so that the former will be of greater strength and can be used as a simple hook when occasion for such use arises. In order to use the member $a$ in this wise, it is only necessary to temporarily withdraw the bolt $c$, so as to separate the members $a$ $b$, and then to arrange the member $b$ so that the upper part thereof will be exterior of the ring $e$.

To prevent any cutting of the eye of the hauling-cable in case the same be affixed on only one of the members $a$ $b$, the inner edges $g$ throughout the portion intermediate of the section-lines $x$ $x$ $z$ $z$ are preferably made rounding on their inner faces, as illustrated in Fig. 4, which shows cross-sections on either of the section-lines last referred to.

In all cases where it is desired to make a hook of smaller or greater dimensions than as shown in Fig. 1 the body of the two members $a$ $b$ of my hook would have to be relatively increased or diminished with respect to their cross-section area, and a like proportioning would have to be observed with respect to the size and cross-section of the ring $e$ and the size of the opening $f$.

Having fully described my invention, what I claim, and desire to secure by Letters Patent, is—

1. A hook comprising two members $a$ $b$, adapted to be arranged together, a bolt pivotally uniting the two members, a sleeve on said bolt, intermediate of said members, and a ring $e$; the ends of said members in the upper part of the hook being adapted to prevent the disengagement of said ring $e$, but yet, when the ring $e$ is arranged against said sleeve, to allow said members to be sufficiently opened so as to be able to attach and remove the eye or ring of a hauling-cable on the lower part of the hook; and the parts being relatively proportioned, substantially as described.

2. A hook comprising two members $a$ $b$, adapted to be arranged together and made with apertured bosses at their middle parts, a bolt inserted through said apertured bosses and pivotally uniting the two members, a sleeve on said bolt intermediate of said members, and made with a central cut-away portion or recess, and a ring $e$; the ends of said members in the upper part of the hook being adapted to prevent the disengagement of said ring $e$, but yet, when said ring $e$ is arranged against said sleeve, to allow said members to be sufficiently opened so as to be able to attach and remove the eye or ring of a hauling-cable on the lower part of the hook; the parts being relatively proportioned, and the extremities of said members being made with convexed and concaved abutting faces so as to interlock with each other, substantially as described.

3. A hook comprising two members $a$ $b$, adapted to be arranged together, and made with apertured bosses at their middle parts, a bolt inserted through said apertured bosses and pivotally uniting the two members, a sleeve on said bolt intermediate of said members, and made with a central cut-away portion or recess, and a ring $e$, the upper ends of said hook members being made with beveled edges as $a'$ $b'$ at their extremities adapted to prevent the disengagement of said ring $e$, but yet, when said ring $e$ is arranged against said sleeve, to allow said members to be sufficiently opened so as to be able to attach and remove the eye or ring of a hauling-cable on the lower part of the hook; the parts being relatively proportioned, and the extremities of said members being made with convexed and concaved abutting faces so as to interlock with each other, substantially as described.

4. A hook comprising two members $a$, $b$, pivotally united on a central longitudinal axis, $c$, and having tapering extremities arranged to be spread apart for inserting or removing a ring or link, the abutting faces of said tapering extremities being made with convexed and concaved abutting faces so as to interlock with each other, substantially as described In testimony whereof I have hereunto affixed my signature in the presence of two witnesses.

ELMER O'BRIEN.

Witnesses:
   T. J. GEISLER,
   ELLA ANDERSON.